United States Patent [19]

Gould

[11] 4,255,550
[45] * Mar. 10, 1981

[54] POLYURETHANE POLYMERS CHARACTERIZED BY CARBOXYLATE GROUPS AND HYDROXYL GROUPS IN THE POLYMER BACKBONE

[75] Inventor: Francis E. Gould, Princeton, N.J.

[73] Assignee: Tyndale Plains - Hunter Ltd., Princeton, N.J.

[*] Notice: The portion of the term of this patent subsequent to May 22, 1996, has been disclaimed.

[21] Appl. No.: 972,609

[22] Filed: Dec. 22, 1978

Related U.S. Application Data

[63] Continuation-in-part of Ser. No. 864,715, Dec. 27, 1977, Pat. No. 4,156,067, which is a continuation-in-part of Ser. No. 809,260, Jun. 23, 1977, Pat. No. 4,156,066.

[51] Int. Cl.$^3$ ............................................. C08G 18/42
[52] U.S. Cl. ........................................... 528/44; 528/59; 528/65; 528/71; 528/73; 528/76; 528/80; 528/84; 128/82; 128/155; 128/132 D
[58] Field of Search ................. 528/59, 65, 71, 73, 528/76, 80, 84, 44; 128/82, 132 D, 155

[56] References Cited

U.S. PATENT DOCUMENTS

| | | | |
|---|---|---|---|
| 3,412,054 | 11/1968 | Milligan et al. | 260/18 TN |
| 4,156,066 | 5/1979 | Gould | 528/73 |

FOREIGN PATENT DOCUMENTS

| | | |
|---|---|---|
| 1250266 | 10/1971 | United Kingdom . |
| 1309056 | 3/1973 | United Kingdom . |
| 1349431 | 4/1974 | United Kingdom . |
| 1419202 | 12/1975 | United Kingdom . |
| 1429210 | 3/1976 | United Kingdom . |
| 1442569 | 7/1976 | United Kingdom . |
| 1455353 | 11/1976 | United Kingdom . |
| 1456890 | 12/1976 | United Kingdom . |
| 1484104 | 8/1977 | United Kingdom . |

Primary Examiner—Maurice J. Welsh
Attorney, Agent, or Firm—Robert W. Kell

[57] ABSTRACT

Water insoluble polyurethane polyether polymers that are soluble in ethanol at pH 11 characterized by a molecular weight above 6,000 and having carboxylate groups and hydroxyl groups in the polymer backbone are prepared by reacting a mixture of polyols, a polyfunctional lactone and a polyfunctional isocyanate proportioned so as to provide the desired polymer properties. The polymer so prepared contains lactone groups and hydroxyl groups in the polymer backbone. The lactone ring is opened by treating the polymer with an alkaline aqueous solution of a water miscible organic solvent to produce a water insoluble polyurethane polyether resin containing carboxylate groups and hydroxyl groups in the polymer backbone. The carboxylate groups may be in the form of a carboxylic acid group or its alkali metal or quaternary ammonium salt. The product is soluble in mixtures of water with a water miscible organic solvent and may be used in the preparation of surgical drapes and burn dressings.

12 Claims, No Drawings

POLYURETHANE POLYMERS CHARACTERIZED BY CARBOXYLATE GROUPS AND HYDROXYL GROUPS IN THE POLYMER BACKBONE

This invention is a continuation in part of my co-pending application Ser. No. 864,715 filed December 27, 1977, issued May 22, 1979 as U.S. Pat. No. 4,156,067; which application was filed as a continuation in part of my then copending application Ser. No. 809,260, filed June 23, 1977 and issued May 22, 1979 as U.S. Pat. No. 4,156,066.

This invention pertains to carboxylate modified hydrophylic polyurethane resins that are insoluble in water, but which swell in water and other solvents. More particularly, the present invention relates to polyurethane polyether carboxylate resins derived from polymers characterized by lactone groups and hydroxyl groups in the polymer backbone, which polymers are described in my co-pending application Ser. No. 864,715 filed Dec. 27, 1977 now U.S. Pat. No. 4,156,067.

In accordance with the present invention a water insoluble polyurethane polyether carboxylate resin is prepared containing carboxylate groups and hydroxyl groups in the polymer backbone by opening the lactone ring that is present in the polyurethane polyether resins described in my co-pending application Ser. No. 864,715 filed Dec. 27, 1977 now U.S. Pat. No. 4,156,067. A polyurethane polyether resin characterized by a molecular weight above 6,000 and having lactone groups and hydroxyl groups in the polymer backbone is contacted with an alkaline solution of water and a miscible organic solvent at room temperature or above to hydrolyze the lactone group and dissolve the polymer. When the lactone groups are opened, carboxylate groups are formed which, depending on the pH of the solution, may be present as the free acid or the acid salt. Since there are hydroxyl groups in the polymer chain of the lactone containing polyurethane and each hydrolyzed lactone group forms one hydroxyl group and one carboxylate group, there will always be more hydroxyl groups than carboxylate groups in the polymer backbone.

Numerous polymer systems that contain free carboxylic acid groups are known in the art. It is difficult, however, to prepare a polyurethane that has free carboxylic acid groups for the reason that the isocyanate that is a necessary component in any polyurethane system is quite reactive with carboxylic acid groups.

One approach to the introduction of carboxylic acid groups into a polyurethane resin chain is described in U.S. Pat. No. 3,412,054. In accordance with that method, a 2,2-di(hydroxymethyl) alkanoic acid such as 2,2-di(hydroxymethyl) propionic acid is reacted with an organic diisocyanate to produce a polyurethane containing unreacted carboxylic acid groups.

Water insoluble polyether resins characterized by a molecular weight of 6,000 and containing a hydroxyl group and a carboxylate radical selected from the group consisting of carboxylic acid and salts thereof in the polymer backbone may be prepared by:

(1) Reacting to form a lactone polymer
(a) A polyfunctional lactone selected from group consisting of (i) lactones having the formula:

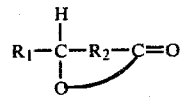

wherein $R_1$ is a monovalent radical selected from the group consisting of $-H$, $CH_2NH_2$, $-SO_2CH_3$, $-CHOHCOOH$, and $-(CHOH)_nCH_2OH$; n being an integer from 0 to 5; and $R_2$ is a divalent radical $-(CHOH)_m-$; m being an integer from 3 to 10 and (ii) D-glucuronolactone;

(b) One or more diols having an equivalent weight in the range of from about 100 to 3,000 selected from the group consisting of (1) diethylene glycol, (ii) long chain polyalkylene diols, (iii) linear polyester diols derived from the condensation of one or more diols with one or more dibasic acids; and (iv) the reaction product of one or more alkylene diols with a difunctional linear polyester derived from the condensation of one or more diols with one or more dibasic acids; and (c) a urethane precursor selected from the group consisting of (i) organic polyisocryanates and (ii) nitrile carbonates.

(2) Dissolving the lactone polymer so obtained in a mixture of a water miscible organic solvent and an aqueous base to form a solution; and (3) Precipitating said polyurethane polyether resin containing a hydroxyl group and a carboxylate radical by pouring the solution into an excess of water with stirring.

The isoelectric point of the numerous polyurethane polyether carboxylate resins that are claimed as my invention varies with the particular resin. Treating a lactone containing resin with ammonia, an amine or an alkali metal hydroxide in a mixture of a water miscible organic solvent and water at room temperature or above will dissolve the resin with formation of an alkali metal or quaternary ammonium salt. The addition of dilute (1:1) hydrochloric acid to such solutions lowers the pH without precipitating the resin. As stated above, the polyurethane polyether carboxylate resin may be isolated by pouring a mixed aqueous-organic solution of the carboxylate resin into an excess of water. It is believed that the carboxylate groups in the polymer backbone are in the form of free carboxyl groups when the resin is precipitated from acid solutions (pH-1.0) and in the form of the alkali metal or quaternary salt where the resin is precipitated from basic solutions (pH-13).

The polyurethane polyether carboxylate resins obtained by hydrolysis of the polyurethane polyether resins that are disclosed in my application Ser. No. 864,715 filed Dec. 27, 1977 now U.S. Pat. No. 4,156,067 are believed to be substantially linear as they are soluble, both in the free carboxylic acid and salt form, in 90 to 95% ethanol at room temperature.

The long-chain, water-soluble diols used in the manufacture of the polyurethane polyether resins of the present invention should have a molecular weight of at least about 200 and preferably 1450 to 6,000 or more and may be derived from ethers, esters and ether-ester block-containing resins. Suitable diols consist predominantly of oxyethylene or oxypropylene groups, though a minor proportion of other oxyalkylene groups may be included. Block copolymer polyols obtained by adding ethylene oxide to a polyoxypropylene chain are also useful as are the linear polyester diols derived from the condensation of one or more diols with one or more dibasic acids, and the reaction product of one or more alkylene diols with a difunctional linear polyester derived from the condensation of one or more diols with one or more dibasic acids. The diols employed need not be polyurethane grade as small amounts of impurities do not seem to interfere with the reaction. Representative examples of the polyfunctional lactones are those derived from polysacharides and monosacharides such as mannolactone, delta gluconolactone, sorbolactone and D-glucuronolactone.

It is important that the lactones employed in the present invention have at least 3 and preferably 4 or more hydroxyl groups in the molecule or at least 1 more than is required to form a linear polyurethane chain. These free (unreacted) hydroxyl groups remain in the polymer backbone and are available for cross-linking the polymer. The lactone ring is also reactive and may be opened, i.e., by hydrolysis, to form carboxylate groups or carboxyl groups in the polymer backbone.

The number of carboxylic groups that are present in the polymer chain will be determined by the amount of lactone that is present in the reaction mixture which may be varied from 0.1% to 30% of the weight of the total reaction mixture. Preferably the weight of the lactone will be 0.5% to 15% of the weight of the total reaction mixture.

The polyisocyanate used in the present invention may be represented by $R(NCO)_n$ wherein n is greater than 1, preferably 2-4, and R is an aliphatic, alicyclic, aliphatic-alicyclic, aromatic, or aliphatic-aromatic hydrocarbon compound of from 4 to 26 carbon atoms, but more conventionally from 6 to 20 and generally from 6 to 13 carbon atoms. Representative examples of the above isocyanates are: tetramethylene diisocyanate; hexamethylene diisocyanate; trimethylhexamethylene diisocyanate; dimer acid diisocyanate; isophorone diisocyanate; diethylbenzene diisocyanate; decamethylene 1,10-diisocyanate; and the aromatic isocyanates such as 2,4-and 2,6-tolylene diisocyanate; 4,4-diphenylmethane diisocyanate; 1,5-naphthalene diisocyanate; dianisidine diisocyanate; tolidine diisocyanate; a polymeric polyisocyanate such as neopentyl tetraisocyanate; m-xylylene diisocyanate; tetrahydronapthalene-1,5 diisocyanate; and bis (4-isocyanatophenyl) methane.

The preferred isocyanate is methylene di(cyclohexyl isocyanate). Other but slightly less preferred diisocyanates are trimethyl hexamethylene diisocyanate and isophorone diisocyanate.

Other compounds which are useful are the isocyanate equivalents which produce the urethane linkages such as the nitrile carbonates, i.e., the adiponitrile carbonate of the formula:

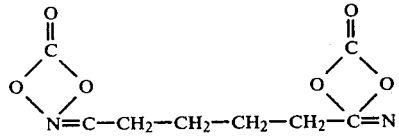

In the manufacture of the polyurethane resins of the present invention, low molecular weight glycols such as diethylene glycol and dipropylene glycol or an aromatic glycol may be added to the reaction mixture. The preferred low molecular weight aromatic polyols are bisphenol A and 4,4'-sulfonyldiphenol.

The proportions in which the long chain polyglycol and the low molecular weight glycol, i.e., diethylene glycol are used depends on the hydrophobic-hydrophylic balance present in each and desired in the final product. Increasing the molecular weight of the long chain polyoxyalkylene glycol and/or the amount of this component contributes strong hydrophylic properties to the final product. This effect may be counterbalanced by increasing the proportion of low molecular weight glycol, i.e., diethylene glycol or dipropylene glycol.

Keeping the above in mind (that it is the number of polyalkylene oxide groups in the polymer molecule that determines hydrophylic properties and the polyethylene oxide groups are more hydrophylic than are polypropylene oxide groups) it is a simple matter to choose mixtures of reactants such that the final product will have the desired properties. By choosing the molecular weight of the polyalkylene glycol or using two polyalkylene glycols of different molecular weight one may "tailor make" products that satisfy a wide range of properties. Amphoteric hydrophylic polyurethane polymers may be made by adding a dialkanol tertiary amine such as diethanol methyl amine to the reaction mixture.

In making the polyurethane resins of this invention, the glycols are mixed with the lactone and the polyisocyanate is reacted with the mixture although other techniques may be used. The reaction is catalyzed by known catalyst for such reaction, suitable ones being tin salts and organic tin esters such as dibutyl tin dilaurete, tertiary amines such as triethyl diamine (DABCD), N,N,N',N'-tetramethyl-1,3butane diamine and other recognized catalysts for urethane reactions which are well known in the art. The reaction can be conducted in the absence or presence of diluent or solvent.

The polyurethane polyether resins that contain lactone groups in the polymer backbone are first formed as precursor resins and the lactone groups are hydrolyzed in an alkaline aqueous solution of a water miscible organic solvent. Suitable water miscible organic solvents are methanol, ethanol, acetone, the cellosolves and carbitols, propanol, isopropanol, propylene glycol and dioxane. The polyurethane polyether resin goes into solution as the lactone groups are hydrolyzed and may be isolated from solution containing a free carboxylate group in the polymer backbone by pouring the solution into an excess of water with rapid stirring.

The polyurethane polyether resins characterized by carboxylate groups and hydroxyl groups in the polymer backbone may advantageously be used as burn dressings and in the manufacture of surgical drapes. The product may be applied to a burn as a powder, film or from solution in a volatile non-toxic solvent and will form a barrier that is permeable to moisture. The physician has a choice of medicaments which may be applied to the burn prior to the resin coating or added to the resin for timed release. A particularly advantageous burn dressing is a powder obtained by the low temperature grinding of from about 1 to about 80 parts by weight of polyvinylpyrolidone-iodine with about 20 to about 99 parts by weight of polyether polyurethane resins having free hydroxyl and carboxylate groups in the polymer backbone.

One may take the isolated polymer and thermally form sheets using conventional presses, extruders and blow molders. Such films, which may vary in thickness from 1 to 5 or more mils. allow free passage of oxygen and carbon dioxide and control the moisture transmission rate.

The above described polyurethane polyether resins containing lactone groups which have been hydrolyzed to form carboxylate groups and hydroxyl groups in the polymer backbone are also useful as coatings, molding compounds, absorbents, controlled release agents, ion exchange resins, in the repair of skin abrasions and in the manufacture of dialysis membranes, dentures, cannulae, contact lenses, solubilizing packaging components, hair sprays, cosmetics, burn dressings, contraceptive devices, sutures, surgical implants, blood oxygenators, intrauterine devices, vascular prostheses, oral delivery systems, battery separator plates, eye bandages, dipilatory compositions, corneal prostheses, perfumes, deodorant compositions, antifog coatings, surgical drapes, oxygen exchange membranes, artificial finger nails, finger cots, adhesives, gas permeable membranes, and in protective and drag resistant coatings.

The practice of the invention is further illustrated by the following examples without being restricted thereto, the parts being by weight, unless otherwise stated.

EXAMPLE 1

Preparation of a Lactone Polymer

Fifty-four hundred and fifty-two parts of polyethylene glycol having a molecular weight of 1,450 (CARBOWAX 1540) is mixed with 720 parts of diethylene glycol with stirring at 70° C. to form a homogeneous melt. To this mixture is added 240 parts of delta gluconolactone in the form of a fine powder and 25 parts of water to foam the polymer. Stirring is continued and 3,594 parts of methylene bis cyclohexyl 4,4'-isocyanate (a product identified as HYLENE W sold by E. I. DuPont de Nemours & Co., Wilmington, Delaware) is added to the mixture. When the temperature drops to 50° C., 20 parts by volume of dibutyl tin dilaurate (a product identified as T-12 manufactured by Metal and Thermit Company of Rahway, New Jersey) is added to the reaction mixture with stirring. The mixture is allowed to exotherm to 70° C. and poured into a small tray and allowed to cure until the temperature from the exothermic heat of reaction falls (about 15 minutes). If polymerization is not complete, heating may be continued in an oven at 100° for thirty minutes.

EXAMPLE 2

Preparation of a Carboxylate Polymer

One hundred parts of the polymer described in Example 1 is cut up and placed in three hundred parts by volume of 95% Ethanol. The polymer is allowed to swell for ten minutes. After swelling is complete, to the swollen mass is added sufficient quantity of 2 Normal sodium hydroxide to maintain the pH between nine and eleven. The polymer dissolves in the solvent with stirring to form a solution.

EXAMPLE 3

Isolation of the Carboxylate Polymer

The solution of the polyurethane polyether polymer containing carboxylate and hydroxyl groups in the polymer backbone is isolated by pouring with rapid stirring the polymer solution described in Example 2 above into 5 times its volume of water. As the polymer solution is added, it is precipitated from solution as a white rubberlike solid. Stirring is continued for five minutes and the polymer is separated from the liquid. The polymer is cut up and again stirred with three to five volumes of water to remove the major portion of ethanol. The washed comminuted solid is then air dried at ambient temperature for 24 hours. Alternatively the solid may be force air dried at 30° to 90° C.

EXAMPLE 4

Preparation of a Burn Dressing

Twenty parts of the polymer described in Example 3 above is dissolved in 80 parts of ethanol and the pH of the solution is adjusted to 5.5 with 0.1 Normal hydrocholoric acid. The solution so obtained is coated on a polyolefin release surface and air dried at a temperature of 20° to 50° C. to form a film 3 mils in thickness. The film is packaged and sterilized by irradiation from a cobalt 60 source. The burn dressing may be medicated if desired by dispersing 5% of a medicament such as silver sulfadiazine in the ethanol polymer solution after the adjustment of pH and prior to casting the film.

EXAMPLE 5

Preparation of a Surgical Drape

A large polyurethane polyether sheet 2½ mils in thickness is prepared by casting the solution described in Example 4 adjusted to pH 7.0 on a release surface. The sheet is readily peeled off of the surface after air drying and is useful as a surgical drape. The pH adjustment is not critical but is preferably in the range of pH 5.0 to 8.0.

EXAMPLE 6

Solution useful in Treating Burns

Twenty parts of the polyurethane polyether resin carboxylate described in Example 3 above is dissolved in 70 parts of 95% Ethanol as described in Example 4 and the pH of the solution is adjusted to pH 5.5 with dilute hydrochloric acid. The solution so obtained is diluted to 20% solids with water and sterilized by heating in a container under pressure at 120° C. for a time sufficient to destroy all pathogenic organisms. The sterile solution may be applied directly to a burn area and will form a polymer barrier through evaporation of the solvent.

EXAMPLE 7

A lactone polymer suitable as a precursor for a carboxylate resin is prepared by reacting:
Polyethylene Glycol (CARBOWAX 6000): 7461 parts
Diethylene Glycol: 208 parts
Delta Gluconolactone (as a 20% solution in dimethyl sulfoxide): 259 parts (0.65 mole)
HYLENE W: 2024 parts (3.16 mole)
Dibutyl tin dilaurate: 15 parts[1]
[1]—parts by volume The lactone groups present in the polymer backbone may be hydrolized by the method described in Example 2.

EXAMPLE 8

A polymer containing lactone groups suitable as a precursor for a carboxylate resin is prepared by reacting:
Polyethylene Glycol (M. Wt. 1450): 9873 parts
Diethylene Glycol: 904 parts (1.64 mole)

Delta gluconolactone (as a 20% solution in dimethyl sulfoxide): 2000 parts (0.65 mole)
HYLENE W: 7203 parts (3.16 mole)
Stannous Octoate[1]: 20 parts [1]

[1]—parts by volume

The carboxylate polymer may be prepared by the method described in Example 2 and isolated in accordance with Example 3.

EXAMPLE 9

This example illustrates the preparation of a lactone polymer suitable as a precursor for a carboxylate resin that is soluble in alkaline 50:50 water - methanol. The method of preparation is described in Example 1 but the Delta Gluconolactone is added in solution.

Polyethylene Glycol (CARBOWAX 6000): 7818 parts
Diethylene Glycol: 220 parts
Delta gluconolactone (as a 20% solution in dimethyl sulfoxide: 142 parts
HYLENE W: 1770 parts
Dibutyl tin dilaurate: 15 parts[1]

[1]—parts by volume

The lactone polymer may be hydrolyzed to form a carboxylate resin as described above.

EXAMPLE 10

A polyurethane polyether resin sutiable as a precursor for a carboxylate resin that is useful in forming burn dressings is prepared by the method described in Example 9 above from:

Polyethylene Glycol (CARBOWAX 6000): 4066 parts
Polyethylene Glycol (CARBOWAX 1540): 1638 parts
Diethylene glycol: 691 parts
Delta glyconolactone (as a 20% solution in dimethyl sulfoxide): 240 parts
HYLENE W: 3336 parts
Dioctyl tin dilaurate: 102 parts

[1]—parts by volume

The lactone resin so obtained is swollen for 15 minutes in 95% ethanol, 5 Normal sodium hydroxide is added to dissolve the resin and the carboxylate polymer isolated by pouring into an excess of water.

EXAMPLE 11

A polyurethane polyether resin suitable as a precursor for a carboxylate resin that is useful in forming a surgical drape is prepared by the method described in Example 9 above from:

Polyethylene Glycol (M. Wt. 300): 3576 parts
Diethylene Glycol: 598 parts
Delta Gluconolactone (as a 20% solution in dimethyl sulfoxide): 413 parts
HYLENE W: 5402 parts
Dioctyl tin dilaurate: 10 parts[1]

[1]—parts by volume

EXAMPLE 12

A polyurethane polyether resin containing lactone groups that is soluble in a major portion of alcohol having a minor amount of base dissolved therein or added with a minor amount of water or other carrier is prepared by the method described in Example 9 above from:

Polyethylene Glycol (M. Wt. 1450): 2000 parts
Diethylene glycol: 107.5 parts
Delta gluconolactone (as a 20% solution in dimethyl sulfoxide): 116 parts
HYLENE W: 808 parts
Stannous Octoate: 5 parts[1]

[1]—parts by volume

The resulting resin may be hydrolyzed as described above to give a polyurethane polyether resin having carboxylate groups and hydroxyl groups in the polymer backbone.

EXAMPLE 13

A polyurethane polyether resin suitable as a precursor for a carboxylate resin is prepared by the method described in Example 9 above from:

Polyethylene Glycol (CARBOWAX 6000): 7461 parts
Diethylene Glycol: 37 parts
Delta Gluconolactone (as a 20% solution in dimethyl sulfoxide): 259 parts
HYLENE W: 2024 parts
Dibutyl tin dilaurate: 15 parts[1]

[1]—parts by volume

After stirring for five minutes, the reaction mixture is transferred to a tray and placed in an oven at 90° C. overnight.

EXAMPLE 14

A series of three polyurethane polyether resins is prepared in which the amount of Delta glucano-lactone is varied.

| Polyethylene Glycol (M. Wt. 1450) | Diethylene Glycol | Delta Glucono-lactone | HYLENE W | Dibutyl tin dilaurate |
|---|---|---|---|---|
| Resin (a) 54.6 g | 8.7 g | 2.9 g | 40.4 g | 0.04 g |
| Resin (b) 54.6 g | 8.7 g | 5.8 g | 40.4 g | 0.04 g |
| Resin (c) 54.6 g | 8.7 g | 11.6 g | 48.5 g | 0.04 g |

The polyethylene glycol and diethylene glycol are melted and mixed together in the absence of a solvent at 70° C. The Delta Gluconolactone and HYLENE W are then added and stirring is continued until the mixture is homogeneous. The mixture is cooled to 45° C. and the dibutyl tin dilaurate is added rapidly with stirring. Stirring is continued for about 15 minutes during which time the exothermic heat of reaction causes the temperature to rise to about 85° C. and the viscosity increases. The polymer is poured while still viscous into a chilling pan and placed in an oven at 75° C. for 20 minutes. The pan is then removed from the oven and cooled to room temperature. The polymer may be removed from the pan and stored indefinitely at room temperature or used immediately as a molding resin. The resin (a) may be molded in a conventional press at 15,000 psi and 125° C. to form a sheet 4 mils in thickness useful as a surgical drape.

What is claimed is:

1. A water insoluble polyurethane polyether resin that is soluble in ethanol at pH 11, containing carboxylic acid groups and hydroxyl groups in the polymer backbone, the number of hydroxyl groups in the polymer backbone being at least equal to the number of carboxylic acid groups; said polyurethane polyether being characterized by a molecular weight above 6,000.

2. A water insoluble salt of the polyurethane polyether resin of claim 1.

3. The water insoluble polyurethane polyether resin of claim 2 wherein said salt is a quaternary ammonium salt.

4. The water insoluble polyurethane polyether resin of claim 3 wherein said quaternary ammonium salt is an ammonium salt.

5. The water insoluble polyurethane polyether resin of claim 2 wherein said salt is an alkali metal salt.

6. A water insoluble polyurethane polyether resin that is soluble in ethanol at pH 11 containing a hydroxyl group and a carboxylate radical selected from the group consisting of carboxylic acid and salts thereof in the polymer backbone, the number of hydroxyl groups in the polymer backbone being at least equal to the number of said carboxylate radicals, said polyurethane polyether resin being characterized by a molecular weight above 6,000; obtained by:

(1) Reacting to form a lactone polymer
   (a) A polyfunctional lactone selected from group consisting of (i) lactones having the formula:

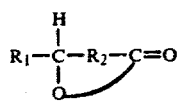

wherein $R_1$ is a monovalent radical selected from the group consisting of —H, $CH_2NH_2$, —$SO_2CH_3$, —CHOHCOOH, and —$(CHOH)_n CH_2OH$; n being an integer from 0 to 5; and R is a divalent radical —$(CHOH)_m$—; m being an integer from 3 to 10 and (ii) D-glucuronolactone;
   (b) One or more diols having an equivalent weight in the range of from about 100 to 3,000 selected from the group consisting of (1) diethylene glycol, (ii) long chain polyalkylene diols, (iii) linear polyester diols derived from the condensation of one or more diols with one or more dibasic acids; and (iv) the reaction product of one or more alkylene diols with a difunctional linear polyester derived from the condensation of one or more diols with one or more dibasic acids; and
   (c) A urethane precursor selected from the group consisting of (i) organic polyisocyanates and (ii) nitrile carbonates.

(2) Dissolving the lactone polymer so obtained in a mixture of a water miscible organic solvent and an aqueous base to form a solution; and (3) Precipitating said polyurethane polyether resin containing a hydroxyl group and a carboxylate radical by pouring the solution into an excess of water with stirring.

7. The polyurethane polyether resin of claim 6 wherein said resin is obtained by reacting a polyfunctional lactone with a long chain polyalkylene diol and a urethane precursor.

8. The polyurethane polyether resin of claim 7 wherein said polyfunctional lactone is delta gluconolactone.

9. The polyurethane polyether resin of claim 7 wherein said urethane precursor is methylene di(cyclohexyl isocyanate).

10. The polyurethane polyether resin of claim 7 wherein said polyalkylene diol is polyethylene diol.

11. A burn dressing comprising the polyether polyurethane resin of claim 1 in the form of a sterile film.

12. A surgical drape comprising the polyether polyurethane resin of claim 1 in the form of a sheet.

* * * * *